United States Patent [19]

Bruhnke et al.

[11] Patent Number: 4,848,509

[45] Date of Patent: Jul. 18, 1989

[54] CENTRAL LOCKING SYSTEM FOR DOOR AND LID FASTENINGS OF A MOTOR VEHICLE

[75] Inventors: Ulrich Bruhnke, Ehningen; Jürgen Körber, Sindelfingen; Helmut Fischer, Böblingen; Ingo Jobmann, Grafenau; Dieter Feichtiger, Aidlingen; Hans Deischl, Jettingen; Günther Weikert, Weil der Stadt; Josef Schumacher, Reutlingen; Klaus Claar, Sindelfingen, all of Fed. Rep. of Germany

[73] Assignee: Daimler-Benz Aktiengesellschaft, Stuttgart, Fed. Rep. of Germany

[21] Appl. No.: 237,335

[22] Filed: Aug. 29, 1988

[30] Foreign Application Priority Data

Aug. 27, 1987 [DE] Fed. Rep. of Germany ....... 3728601

[51] Int. Cl.[4] ........................ E05B 65/38; B60R 25/04

[52] U.S. Cl. ................................ 180/287; 123/198 B; 70/237; 307/10.2

[58] Field of Search .................... 180/287; 123/198 B; 307/10 AT; 340/63, 64; 70/237, 264

[56] References Cited

U.S. PATENT DOCUMENTS 4,485,887 12/1984 Morano .............................. 180/287
4,691,801 9/1987 Mann .................................. 180/287
4,739,736 4/1988 Branco ............................... 180/287

FOREIGN PATENT DOCUMENTS 3531349 7/1986 Fed. Rep. of Germany .

*Primary Examiner*—Richard A. Bertsch
*Attorney, Agent, or Firm*—Barnes & Thornburg

[57] ABSTRACT

A central locking system for motor vehicles, not only doors and tailgate and gas tank-cap lids, but also several flaps of containers arranged in the passenger space (gloveboxes, small luggage compartments). These locks can be released and locked jointly by a unitary switch signal, or for specific conditions, both the doors and lids and the flaps can respectively be locked and released separately in groups.

9 Claims, 1 Drawing Sheet

CENTRAL LOCKING SYSTEM FOR DOOR AND LID FASTENINGS OF A MOTOR VEHICLE

BACKGROUND AND SUMMARY OF THE INVENTION

The invention relates to a central locking system (ZVA) for a motor vehicle and more specifically to a central locking system for doors, tailgates or trunks, gasoline cap lids, and flaps of containers arranged in the passenger space, for example gloveboxes, small luggage compartments etc.

A ZVA of the relevant generic type is known from German Patent Specification No. 3,531,349.

It is also already known to equip flap fastenings located in the passenger space of a motor vehicle, for example the glovebox and additional storage spaces, with closures to be actuated by a key. Thus, these flap fastenings can each be locked against unauthorized access.

Such an arrangement is found, for example, in estate cars manufactured by Daimler-Benz, assignee of the present application, and is mentioned expressly in the operating instructions for these. The operating instructions also note that the tailgate lid fastening can be brought, as a result of key actuation of its closing point, into a locked closing position disconnected from the ZVA. Re-release of the tailgate lid fastening is then possible only as a result of a renewed key actuation of its closing point and not by the ZVA from another closing point.

Vehicles which can be driven and parked with an open canopy top have lacked a convenient ZVA which enables the vehicle user to lock centrally storage and luggage compartments in the passenger space, on the one hand jointly with the vehicle doors and the tailgate lid and on the other hand arbitrarily independent of these, against unauthorized access as a result of key actuation of a particular individual closing point.

The object of the invention is to develop a ZVA of the relevant generic type in the way indicated.

According to the invention, this object is achieved as follows.

The central control circuit (ZS) of the ZVA can also be operated as a result of key actuation of an additional closing point provided in the passenger space and coupled to a control switch. This additional closing point is in addition to the closing points at the doors and trunk lid.

A change-over device is inserted in connections between the actuating elements for door and trunk lid fastenings and the ZS and between the actuating elements for container flap fastenings and the ZS. Controlled by the ZS and switch signals from various closing points or control switches, the ZS connects to the ZS of its drive means (for example, dual pressure pump) for the actuating elements either only the door fastening and lid fastening actuating elements or only the flap-fastening actuating elements or, in response to a single switch command, all the actuating elements jointly.

An identification arrangement at those closing points which can be released and locked from outside the vehicle by the key and from inside the vehicle by an interior actuating handle, feeds a key recognition signal to the ZS when a key is used. As a result of the relationship of the key recognition signal to a change-over signal from a control switch assigned to the actuated closing point, a distinction is made in the switch logic of the ZS as to whether the ZS was actuated from outside or from inside.

If the vehicle is locked from inside, the flap-fastening actuating elements are not operated with the door locking, since it can be assumed that a vehicle user is in the passenger space and, although wanting to know that the doors and the tailgate lid of the vehicle are protected against unauthorized entry, even during driving, nevertheless still wishes to have free access to the containers in the passenger space.

Separate central locking of the container flap fastenings is possible, however, by locking the additional closing point in the passenger space.

Advantageously, a master key/secondary key (HS/NS) system of a type known per se can also be used for the ZVA disclosed here.

Thus, HS and NS can be used at the driver/front-seat passenger door closing points, while the additional closing point in the passenger space can be actuated only by the HS in a known way.

Then deviating from the state of the art, the identification arrangement can advantageously be designed so that it generates its key recognition signal even when the NS is used.

Further advantageous designs of the ZVA according to the invention emerge from the use of a storage circuit connected to the key identification for assuming a set state in response to a locking signal from one of the door or lid switches and allowing renewed operation of the central control unit only as a result of key actuation of one of the door or trunk closing points with the effective release. A logic circuit is provided to allow renewed activation of the central control circuit by a signal from the trunk lid closing point, or by the simultaneous occurrence of a release signal from the door closing point and a key recognition.

The central control circuit can include a dual pressure pump driven by an electric motor and fluid overpressure and underpressure elements in combination with a solenoid valve as the change-over device. The central control circuit controls the motor pump and solenoid valve to effectuate the appropriate operation. Separate circuits are provided for the door fastening and lid fastening elements from the flap fastening elements. Threshold switches are provided to provide appropriate feedback signals and sequence control of the operation.

Other objects, advantages and novel features of the present invention will become apparent from the following detailed description of the invention when considered in conjunction with the accompanying drawings.

DETAILED DESCRIPTION OF THE DRAWINGS

Figure 1:
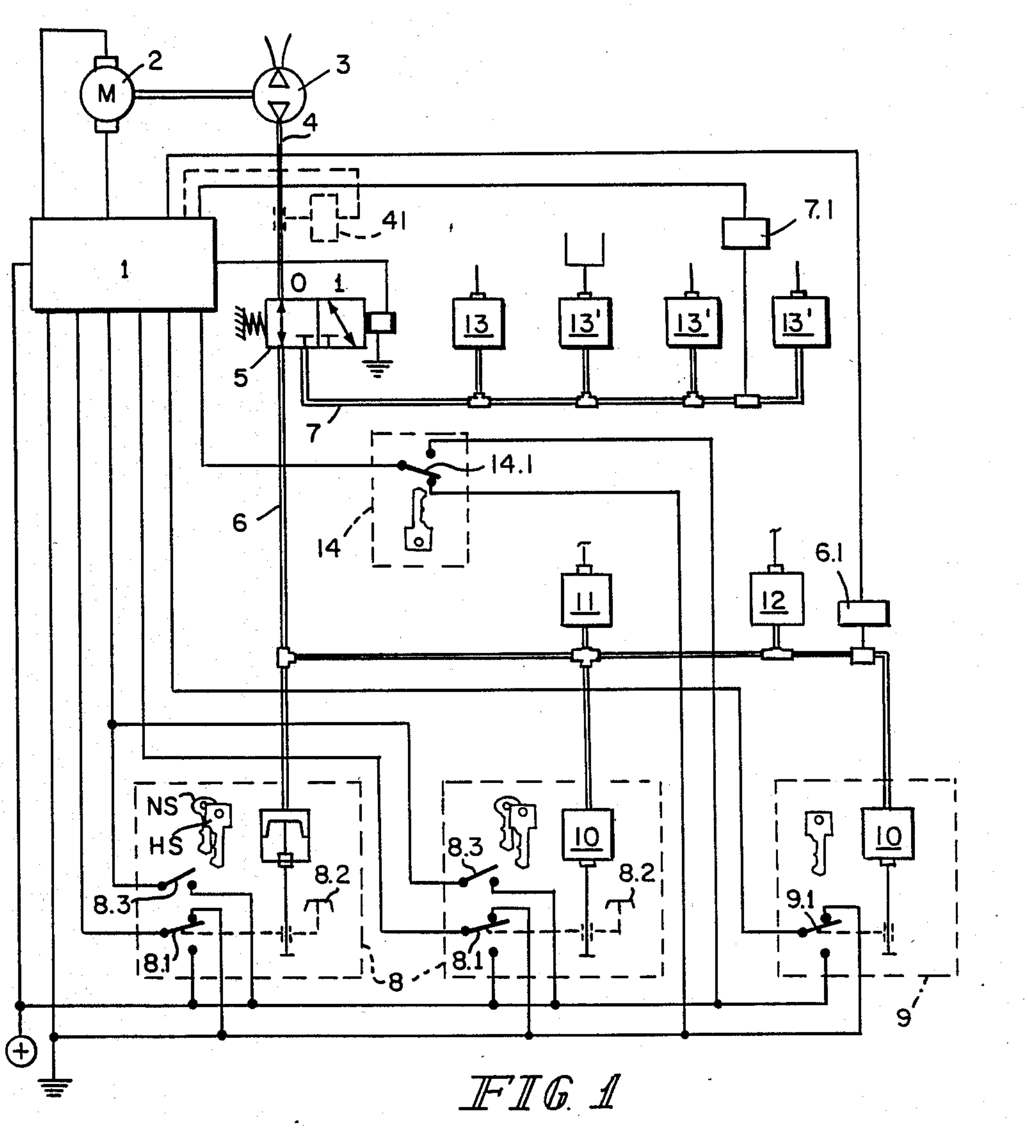
FIG. 1 shows a general diagram of an electropneumatic ZVA.

An electrical or electronic central control circuit (ZS) 1 controls an electric motor 2 and consequently a dual pressure pump 3 driven reversibly by the electric motor 2 and with a pressure/underpressure outlet 4. Connected fluidically to the outlet 4 as a change-over device is a 3/2-way solenoid valve 5 which is likewise controlled electrically by the ZS1. The valve 5 assumes currentless its basic switch position "0" and can be changed over for a set time to a position "1" counter to a restoring spring force. It serves as a pressure/underpressure fork for the alternate connection of an external delivery line branch 6, in position "0", and an internal delivery line branch 7, in position "1", to the pressure/underpressure outlet 4.

Connected fluidically to the external delivery line branch 6 at two first closing points 8 and a second closing point 9 are respectively a door fastening actuating element 10, for driver and front-seat passenger door fastenings and for the key actuable tailgate lid fastening, and further door fastening and lid fastening actuating elements 11 for rear doors and 12 for the gas tank-cap lid.

At the identically constructed closing points 8 which can be actuated both by a master key (HS) and by a secondary key (NS), indicated by symbols, there are respectively an electrical control switch 8.1 coupled to the actuator of the actuating element 10 and an interior actuating knob 8.2 likewise coupled to the actuator. Furthermore, each closing point 8, likewise coupled to the actuator of 10, to the control switch 8.1 and to the interior actuating knob 8.2, is equipped with an electrical identification arrangement in the form of a make-contact switch 8.3 closed at the closing point when either key HS or NS is used.

At the second closing point 9 there is only one control switch 9.1 which corresponds in functional terms to the control switches 8.1. The closing point 9 can be actuated only by the master key HS. The control switches 8.1 and 9.1 are bistable pole-changing switches which can be changed over between positive potential and negative potential and which apply the respective electrical potential present to an individual terminal of the ZS 1.

A glovebox-flap-fastening actuating element 13 and further flap-fastening elements 13' are connected fluidically to the internal line branch 7. In addition to the glovebox, further containers, such as door pockets and compartments for audio cassettes or compact discs and small luggage, can now also be protected against unauthorized access by the ZVA.

Here, all the actuating elements are designed as diaphragm-piston elements of known constructional type, as indicated by the cutaway representation of an actuating element 10 at a closing point 8. Thus, the flap-fastening actuating elements 13 and 13' can be equipped with piston rods which at the same time are designed as bolts and which, for locking, are guided by a tab attached to the particular container flap. If a flap-fastening actuating element 13' has a piston rod forked at the end, for example, two flap fastenings arranged next to one another can be secured by only one actuating elements.

A pressure actuated or underpressure-actuated switch device 6.1 and 7.1 is provided in the external delivery line branch 6 and in the internal delivery line branch 7, respectively. These switch devices respond only at a specific pressure/underpressure level, before the attainment of which the actuating elements 10, 11, 12, 13 25 and 13' have been safely changed over, and transmit to the ZS 1 a respective electrical threshold value switch signal. In principle, the switch devices 6.1, 7.1 can also be combined with an actuating element of a higher response threshold, for example with a throttle connection or with a pressure transducer, as illustrated.

A further closing point 14 is arranged in the passenger space of the vehicle, for example, on the dashboard, and can be moved into a released closing position and a locked closing position by the master key HS only. The adopted closing position is to be directly recognizable from the outside, for example from the position of the keyhole. Also corresponding to the closing position of the further closing point 14 is the switch position of a further control switch 14.1 which is coupled to the closing point 14 and which is connected electrically in the same way as the other control switches 8.1 and 9.1.

Thus, the ZS 1 has, in addition to positive and earth terminals, four separate terminal inputs for the two first control switches 8.1, the second control switch 9.1 and the further control switch 14.1. It can therefore be determined unmistakably in the electronic switch logic of the ZS1, which of the control switches the ZS1 is being operated.

Furthermore, the key recognition signal from the make-contact switches 8.3 is likewise fed to an input of the ZS 1, and a terminal input of the ZS 1 is also assigned to each of the switch devices 6.1 and 7.1.

For the central release or locking of several fastenings, the ZS1 is operated in a known way by changing over one of the control switches and by the resulting potential change at the corresponding terminal input.

Here, the further closing point 14 is provided only for the central release and locking of the container flap fastenings by the actuating elements 13 and 13'. It is itself not necessarily combined with an actuating element, but in contrast to the representation in FIG. 1, can be constructed mechanically in a similar way to the second closing point 9.1.

In the exemplary embodiment, potential change signals from the control switches 8.1 are linked to the key recognition signal from the make-contact switches 8.3. When both signals are present simultaneously, the switch logic of the ZS1 concludes from this that one of the first closing points 8 has been actuated by a key. If the key recognition signal is absent, the respective control switch 8.1 has been changed over by the interior actuating knob 8.2.

Activation of the solenoid valve 5 for the joint locking or release of all the doors, lid and flap fastenings, can take place from a closing point 8 under two conditions only;

(1) the further closing point 14 must be in the released closing position, because, in the locked closing position of the closing point 14, its control switch 14.1 applies a blocking signal to the ZS1 to counter the change-over of the solenoid valve 5 from the basic switch position "0" to the position "1", and (2) the key recognition signal from a make-contact switch 8.3 and a potential change signal from a control switch 8.1 must be applied simultaneously to the ZS1.

The following cycle, explained by keywords, is then obtained:

(1) Releasing the locked vehicle from the outside;

(a) release with a key (HS or NS) at one of the first closing points 8;

(b) make-contact switch 8.3 closed;

(c) potential change from negative to positive at the control switch 8.1 and likewise at the corresponding terminal input of the ZS1;

(d) the dual pressure pump 3 is driven to generate overpressure, the actuating elements 10, 11 and 12 are operated with the effect of release;

(e) the switch device 6.1 transmits a threshold value switch signal to the ZS1;

(f) the solenoid valve 5 is changed over from "0" to "1" by the ZS1;

(g) the actuating elements 13 and 13' are operated with the effect of release;

(h) the switch device 7.1 transmits a threshold value switch signal to the ZS1;

(i) the dual pressure pump 3 is switched off; and (j) he solenoid valve 5 automatically returns to the basic switch position "0".

(2) For the separate locking of the flap fastenings, the following cycle is obtained:

(a) the further closing point 14 is brought into the locked closing position by the master key HS;

(b) a potential change at the further control switch 14.1 from positive to negative and likewise at the corresponding terminal input of the ZS1;

(c) the solenoid valve 5 is changed over from "0" to "1";

(d) the dual pressure pump 3 is driven to generate underpressure, the actuating elements 13 and 13' are operated with the effect of locking;

(e) the switch device 7.1 transmits a threshold value switch signal to the ZS1;

(f) the dual pressure pump 3 is switched off;

(g) the solenoid valve 5 returns to "0"; and (h) the control switch 14.1 applies with negative potential a blocking signal to the ZS1 to counter the change-over of the solenoid valve 5.

Starting from the state now reached, the flap fastening actuating elements 13 and 13' can be operated to free the flap fastenings again, only after the closing point 14 has been released again with the effect of release by the master key HS.

(3) The door and lid fastenings on the outside of the motor vehicle can also, starting from the completely released state, be locked separately according to the cycle:

(a) actuate the interior actuating knob 8.2 with the effect of locking;

(b) a potential changing at the coupled control switch 8.1 from positive to negative and likewise at the corresponding terminal input of the ZS1, but no key recognition signal;

(c) the dual pressure pump 3 generates underpressure and operates the actuating elements 10, 11, 12 with the effect of locking;

(d) the switch device 6.1 transmits a threshold value switch signal to the ZS1; and (e) since there is no key recognition signal present, the dual pressure pump 3 is switched off, the flap fastenings remain released.

Re-release of the door and lid fastenings from inside is carried out accordingly in reverse order.

(4) Finally, a completely released vehicle is completely locked centrally from the tailgate lid fastening according to the cycle:

(a) actuate the closing point 9 with the effect of locking by the master key HS;

(b) a potential change at the control switch 9.1 from positive to negative and likewise at the associated terminal input of the ZS1;

(c) the dual pressure pump 3 generates underpressure and operates the actuating elements 10, 11, 12 with the effect of locking;

(d) the switch device 6.1 transmits a threshold value switch signal to the ZS1;

(e) the closing point without the possibility of interior actuation has been actuated; the change-over of the solenoid valve from "0" to "1" also takes place without a key recognition signal being present;

(f) the actuating elements 13 and 13' are operated with the effect of locking;

(g) the switch device 7.1 transmits a threshold value switch signal to the ZS1;

(h) the dual pressure pump 3 is switched off; and (i) the solenoid valve 5 returns to "0".

Since a definite association between the potential change signals and the particular control switch is obtained in the ZS1 and the control switch 9.1 of the second closing point 9 cannot be changed over as a result of interior actuation, for the cycle (4) there is no need to link the potential change signal to the key recognition signal in order to change over the solenoid valve 5.

It proves advantageous, especially in the case of Convertible vehicles, after a locking operation for one of the closing points 8 by the keys HS or NS or manually, or the closing point 9 by key HS or manually, as a result of the respective potential change signal from positive to negative generated, to set a storage circuit in the ZS1 to a state in which renewed activation of the ZS1 can take place only either:

(1) by a potential change signal of the control switch 9.1 from negative to positive; or (2) by a potential change signal of a control switch 8.1 from negative to positive; and a key recognition signal present simultaneously at switch 8.3.

This measure prevents an unauthorized person from reaching the content of the boot or of the containers in the passenger space, for example by gaining access to a vehicle parked with an open canopy top, but locked from outside by the key HS or NS and releasing it via the ZVA by the interior actuating knob of a door, this indeed being possible during driving. At the very most, he can release the particular door mechanically.

In an equivalent alternative version of the ZVA, in which the key recognition signal is generated only when the master key HS is used, and in which, furthermore, both the second closing point 9 and the further closing point 14 can be actuated only by the master key HS, as hitherto, without the need for a passive circuit of the ZS1 it is possible to prevent a user of the secondary key NS from gaining access to the containers, without the further locking point 14 having to be locked. For this purpose, the vehicle must have been locked from outside by the master key HS, so that all the actuating elements have locked their associated fastenings. If the secondary key NS is used at one of the first closing points 8, the solenoid valve 5 is then not changed over, with the result that the flap fastenings remain locked. However, in this alternative version, there would, if appropriate, have to be the possibility of disconnecting the tailgate lid fastening from the ZVA in a known way.

Figure 2:
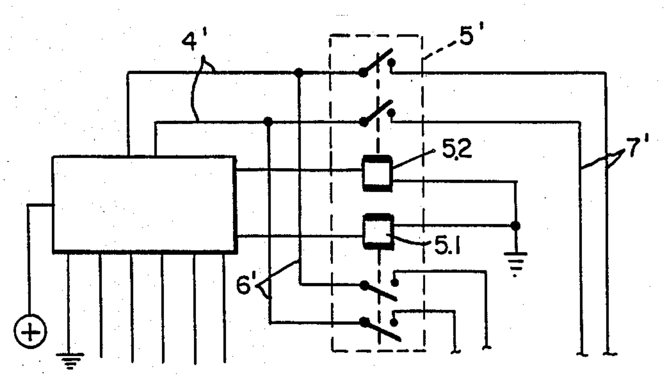
FIG. 2 shows an alternative version of the change-over device for a ZVA with electrically operated actuating elements.

FIG. 2 illustrates diagrammatically a change-over device 5' which is provided for the ZVA with motor or magnet-actuating elements (not shown) operated electrically by the ZS1 via an electrical double line 4'. It consists of two make relays 5.1, 5.2 which each have a double switch contact and which each connect a double-line branch 6' and 7' to or isolate it from the ZS1 which, moreover, is controlled as in FIG. 1.

By this arrangement, all the actuating elements connected to the two double-line branches 6', 7' can be operated simultaneously, since the make reays 5.1, 5.2 can be changed over independently of one another.

In the electropneumatic ZVA according to FIG. 1, two 2/2-way valves, each in a delivery line branch 6 and 7, would have to be provided for the same purpose.

Conversely, of course, a make-and-brea relay equivalent to the 3/2-way valve 5 and having a double switch contact can also be provided for an electrical ZVA.

If only one delivery line branch of double-line branch is respectively connectable alternately to the ZS1 by the change-over device, it is of course necessary to ensure that, during the joint operation of all the actuating elements on the door, lid and flap fastenings, first all the actuating elements connected to the first branch have been changed over safely. Only then is the change-over device changed over to the second branch, and then all the actuating elements of the second branch are changed over safely.

In the electropneumatic ZVA according to FIG. 1, this can be achieved by the switch devices 6.1 and 7.1, as the first to respond, for the joint operation of all the actuating elements, generates a change-over signal for the solenoid valve 5 and only the second to respond generates a final switch-off signal, as occurs in the functional cycles 1–4 listed above. When there is separate operation of the actuating elements of a branch, the threshold value switch signal from the switch device arranged in this branch is then at the same time the final switch-off signal.

However, as an alternative version, above all for an electrical ZVA, it is also possible for the actuating elements of each branch to be operated within constant periods of time safely sufficient for changing over the actuating elements. These periods of time are then stored in the ZS1 by appropriate switch elements.

Then, in the joint operation of all the actuating elements, a first operating period will first elapse, thereupon the change-over device will be changed over and then a second operating period will elapse.

As a further alternative, again especially in an electropneumatic ZVA, both the change-over of the solenoid valve 5 and the final switch-off of the electric motor 2 or of the dual pressure pump 3 can be Controlled by threshold value switch signals from an individual switch device 4.1, represented by broken lines in FIG. 1 and known per se, at the pressure outlet 4 of the dual pressure pump 3. During the joint operation of all the actuating elements, the first threshold value switch signal from the switch device 4.1 is interpreted by the ZS1 as a change-over signal for the 3/2-way solenoid valve. With the change-over of the solenoid valve, the pressure level or underpressure level at the pressure connection 4 is again lowered below the particular threshold value. Appropriately, in the two delivery line branches 6 and 7 there are ventilating throttles which allow a slow pressure equalization with the atmosphere in the state of rest.

The dual pressure pump 3 now continues to operate until, after the change-over of the actuating elements, a renewed threshold value switch signal causes the final switch-off of the electric motor in the second delivery line branch.

The various functions of the ZS1, such as:

recognizing from which closing point a potential change signal originates;

recognizing whether a blocking signal comes from the control switch 14.1;

recognizing whether a threshold value switch signal will control the change-over device or cause the final switch-off of the actuating elements of the electric motor of the dual pressure pump;

necessitate logical signal links which can advantageously be executed by an appropriately programmed microprocessor. A power state will have to be provided for operating the actuating elements or the electric motor.

Although only keys and closing points were discussed in the foregoing text, it should nevertheless be pointed out that a ZVA according to the invention could also be operated by remote control via ultrasonics or infrared radiation. In this case, transmitters, which can likewise be coded differently in the same way as the keys HS and NS, correspond to the keys, while the closing points will be designed as receiver modules. Of course, mechanical effects, the identification arrangement and the coupling of closing points to control switches, must then be replaced by appropriate electric equivalents.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Central locking system for door and lid fastenings of a motor vehicle which are releasable and lockable by power-operated actuating elements, comprising:

multi-point operation of an electrical central control circuit, operating the actuating elements at least indirectly (a) from outside by key actuation of first closing points located on doors and equipped with an identification means for key recognition and for generating a key recognition signal, and (b) from inside by manual actuation of handles, arranged in the passenger space of the motor vehicle and belonging to the door fastenings, by first control switch means coupled to the first closing points and to the handles;

a change-over means connected between the central control circuit and at least one actuating element, for changing over when a key recognition signal is present and in a specific switch position, for isolating each following actuating element from the central control circuit;

a glovebox flap fastening lockable by the central locking system;

second closing point in the passenger space and to be brought into a released and a locked closing position by key actuation and coupled mechanically to a bistable second control switch means for operating the central control circuit and for changing over the change-over means controlled electrically by the central control circuit;

flap fastening actuating element assigned to the glovebox flap fastening and to flap fastenings of several containers accessible from the passenger space;

said change-over means being connected both between the door fastening and lid fastening actuating elements and the central control circuit and between the flap fastening actuating elements and the central control circuit;

in the locked closing position of the second closing point, the second control switch means applies a blocking signal to the central control circuit, and in response to the said blocking signal, said central control circuit prevents change-over of the Change-over means to a switch position connecting the flap fastening actuating elements to the central control circuit until the second closing point is in said released position;

in response to key actuating of the second closing point, said central control circuit changes-over the change-over means, at least for a set time, to the switch position isolating the door fastening and lid fastening actuating elements from the central control circuit and connecting the flap fastening actuating elements to the central control circuit to allow separate operation of the flap fastening actuating elements by the central control circuit;

said central control circuit, only when there is simultaneous key actuation of one of the first closing points and of released closing position of said second closing point, changes over the change-over means for a set time in response to the key recognition signal fed from the identification means to the central control circuit, to allow joint operation of the door fastening and lid fastening actuating elements, and of the flap fastening actuating elements by the central control circuit.

2. Central locking system according to claim 1, wherein:

said first closing points are actuated both by a master key and by a secondary key;

said identification means generates the key recognition signal when either key is used;

the central control circuit includes a storage circuit connected to the identification means, for assuming a setting state in response to a locking signal from one of the first control switch means, and allowing renewed operation of the central control unit only as a result of key actuating of one of the first closing points with the effect of release, the storage circuit being reset at the same time as the renewed operation, and said second closing point can be actuated only by said master key.

3. Central locking system according to claim 2:

including a third closing point actuated only by said master key and is on the tailgate lid of the vehicle and a third control switch at said third closing point for operating the central control circuit, both the third control switch and each of the first control switches being connected respectively to a terminal of the central control circuit, and wherein the central control circuit includes logic means for activating the change-over means either for simultaneous occurrence of the key recognition signal from the identification means and release signals from the first control switches or for signals from the third control switch.

4. Central locking system according to claim 1:

including a dual pressure pump driven by an electric motor and with actuating elements operably fluid overpressure and fluid underpressure;

wherein said change-over means includes 3/2-way solenoid valve, to an input terminal of which is connected a delivery outlet of the dual pressure pump and which alternately connects to the delivery outlet of the dual pressure pump an external delivery line branch, to which the door fastening and lid fastening actuating elements are connected, and an internal delivery line branch, to which the flap fastening actuating elements are connected.

5. Central locking system according to claim 4, wherein the 3/2-way solenoid valve includes means for returning it automatically to its basic position connecting the door fastening and lid fastening actuating elements to the central control circuit.

6. Central locking system according to claim 4, including a pressure sensitive or underpressure sensitive switch device in each of the two delivery line branches, connected electrically to the central control circuit and feeds a threshold value switch signal to the central control circuit at a specific pressure level or underpressure level present in the respective delivery line branch, the pressure or underpressure level being set so that all the actuating elements connected to the respective delivery line branch have safely been actuated before this pressure level or underpressure level is reached; and said control circuit being responsive to said threshold value switch signal such that (a) when there is joint operation of all the actuating elements, a first threshold value switch signal causes a change-over of the change-over means, with the dual pressure pump continuing to run, and a second threshold value switch signal causes the final switch-off of the electric motor or of the dual pressure pump; and (b) when there is separate operation of the actuating elements connected to a delivery line branch, the threshold value signal of the respective switch device causes the final switch-off of the electric motor.

7. Central locking system according to claim 4:

including an individual pressure sensitive or underpressure sensitive switch device fluidically between the dual pressure pump and the 3/2-way solenoid valve for feeding threshold value switch signals to the central control circuit, and wherein said central control circuit being responsive to said threshold value switch signal such that (a) when there is joint operation of all the actuating elements, a first threshold value switch signal from the switch device, responding respectively later than the actuating elements, causes a change-over of the 3/2-way solenoid valve, with the dual pressure pump continuing to run, and a second threshold value switch signal causes the final switch-off of the electric motor or of the dual pressure pump; and (b) when there is separate operation of the actuating elements connected to a delivery line branch, the first threshold value switch signal from the switch device causes the final switch-off of the electric motor.

8. Central locking system according to claim 1, wherein the change-over means includes two change-over elements which are electrically switchable independently of one another, one change-over element is in a connecting branch between the central control circuit and the door fastening and lid fastening actuating elements and the other change-over element is in a connecting branch between the central control circuit and the flap fastening actuating elements.

9. Central locking system according to claim 1, wherein:

first closing points are actuated both by a master key and by a secondary key;

the key recognition signal is generated by the identification means only when the master key is used;

the second closing point is actuated only by the master key, whereby after the central locking of the vehicle from one of the first closing points by the master key, even in a released switch position of the second closing point it is not possible for a holder of a secondary key to release the centrally locked flap fastenings.

* * * * *